United States Patent
Zima et al.

(10) Patent No.: US 7,277,779 B2
(45) Date of Patent: Oct. 2, 2007

(54) REAL-TIME EMERGENCY CONTROL IN POWER SYSTEMS

(75) Inventors: Marek Zima, Baden (CH); Mats Larsson, Baden (CH); Joachim Bertsch, Kilchberg (CH)

(73) Assignee: ABB Research Ltd, Zurich (CH)

( * ) Notice: Subject to any disclaimer, the term of this patent is extended or adjusted under 35 U.S.C. 154(b) by 280 days.

(21) Appl. No.: 10/870,160

(22) Filed: Jun. 18, 2004

(65) Prior Publication Data

US 2005/0099747 A1    May 12, 2005

(30) Foreign Application Priority Data

Jun. 21, 2003 (EP) .................... 03405451

(51) Int. Cl.
G05D 3/12 (2006.01)
G05F 1/70 (2006.01)

(52) U.S. Cl. .................... 700/292; 323/207
(58) Field of Classification Search ............. 700/292; 323/207, 211
See application file for complete search history.

(56) References Cited

U.S. PATENT DOCUMENTS

| | | | | |
|---|---|---|---|---|
| 4,055,795 A | * | 10/1977 | Mathieu | 323/211 |
| 4,425,541 A | * | 1/1984 | Burkum et al. | 324/548 |
| 4,623,884 A | * | 11/1986 | Ihara et al. | 370/224 |
| 5,387,821 A | * | 2/1995 | Steciuk et al. | 307/105 |
| 5,698,969 A | * | 12/1997 | Gyugyi | 323/207 |
| 5,745,368 A | | 4/1998 | Ejebe et al. | |

FOREIGN PATENT DOCUMENTS

WO    WO90/15369    12/1990

OTHER PUBLICATIONS

I.A. Hiskens et al., "Power System Applications of Trajectory Sensitivities", 2002 IEEE Power Engineering Society, Winter Meeting, Conference Proceedings, New York, NY, Jan. 27-31, 2002, vol. 2, pp. 1200-1205.
I.A. Hiskens et al., "Trajectory Sensitivity Analysis of Hybrid Systems", IEEE Trans. Circuits Syst. 1, Fundamental Theory and Applications, vol. 47, No. 2, Feb. 2000, pp. 204-220.

(Continued)

*Primary Examiner*—Leo Picard
*Assistant Examiner*—Sheela Rao
(74) *Attorney, Agent, or Firm*—Buchanan Ingersoll & Rooney PC

(57) ABSTRACT

The present invention is concerned with a method for real-time emergency control of power transmission networks, based on a modification of the model predictive control (MPC) approach. Following the detection of a contingency at time $t_c$ only one nominal trajectory $x_{nom}$ is approximated, together with its corresponding trajectory sensitivities for evaluating the effect of various key parameters or potential control actions. An optimum input control is finally identified via the solution of a cost function including e.g. a punishment for excessive load shedding. The process is started only if the nominal trajectory does not remain within acceptable trajectory limits.

8 Claims, 3 Drawing Sheets

OTHER PUBLICATIONS

M.J. Laufenberg et al., "A New Approach to Dynamic Security Assessment Using Trajectory Sensitivities", IEEE Trans. on Power Systems, vol. 13, No. 3, Aug. 1998, pp. 953-958.

T.B. Nguyen et al., "Dynamic Security-Constrained Rescheduling of Power Systems Using Trajectory Sensitivities", IEEE Trans. on Power Systems, vol. 18, No. 2, May 2003, pp. 848-854.

D. Rerkpreedapong et al., "Economy Oriented Model Predictive Load Frequency Control", Lescope'03, Large Engineering Systems Conference on power Engineering, Conference Proceedings, Montreal, Quebec, Canada May 7-9, 2003, pp. 12-16.

D.G. Hart et al., "PMUs—A new approach to power network monitoring", ABB Review Jan. 2001, pp. 58-61.

Sauer, Peter W., "Post-Contingency Equilibrium Analysis of Power Systems." Proceedings of the 35th Hawaii International Conference on System Sciences—2002. IEEE, 2002. pp. 1-4.

* cited by examiner

REAL-TIME EMERGENCY CONTROL IN POWER SYSTEMS

FIELD OF THE INVENTION

The invention relates to power systems such as electric power transmission networks. It is concerned with a real-time method for controlling emergencies in the power system.

BACKGROUND OF THE INVENTION

In the wake of the recent and still ongoing deregulations of the electric power markets, load transmission and wheeling of power from distant generators to local load consumers has become common practice. As a consequence of the competition between utilities and the emerging need to optimize assets, substantially increased amounts of power are transmitted through the existing networks, invariably causing transmission bottlenecks and significant hourly variations of the generation and transmission pattern. This results in power transmission systems being operated ever closer to their stability boundaries and thus necessitates very accurate monitoring of the system's stability and real-time control mechanisms. Power systems in general can be viewed as non-linear hybrid systems, as they involve a combination of both continuous and discrete dynamics and corresponding control options.

Electric power transmission and distribution systems or networks comprise high-voltage tie lines for connecting geographically separated regions, medium-voltage lines, and substations for transforming voltages and for switching connections between lines. For managing the network, it is desirable to determine a state of the network, in particular load flows and stability margins. In recent times, not only root mean square (RMS) values of voltages, currents, active power and reactive power flowing in the network have been determined, but devices and systems for measuring voltage and current phasors at different locations of a network at exactly the same time have become available. The article "PMUs—A new approach to power network monitoring", ABB Review 1/2001, p. 58, mentions a device called Phasor Measurement Unit (PMU) for accurate time-stamping of local power system information. A plurality of such phasor measurements collected from throughout the network at a central data processor in combination provide a snapshot of the overall electrical state of the power system.

The evolution in time of the overall state of the power system or a particular physical system quantity, such as the voltage at a certain node of a transmission network, is represented by a one—or multidimensional trajectory. Based on the current state of the system and taking into account potential control actions applied to the system, a future progression of the trajectory may be calculated. For instance, Model Predictive Control (MPC) is an academically and industrially well-known and accepted method for process control. The main principle can be seen from FIG. 1. A system model, representing e.g. a real power system and taking into account its dynamics, is used to predict output trajectories ($x^i$) based on the current state at time $t_0$ and for several different potential candidate input sequences ($\Delta x^i$). A cost function is then defined based on the deviation of each predicted trajectory from a desired reference trajectory ($x_{ref}$) over a window in time called the prediction interval ($t_p$). The optimal control, in the sense that it minimizes the defined cost function, is then obtained by solving an optimization problem.

There are two fundamentally different stages in MPC. Firstly there is a prediction stage which results in an approximation of the output trajectories for a certain input sequence. For linear systems this can be done by a number of matrix multiplications but for nonlinear systems this is usually done by simulation. Secondly there is a decision stage which typically consists of minimizing or maximizing a numerical performance objective which is based on the deviations of the trajectory approximation from a desired reference trajectory. Different methods have been applied such as linear/quadratic programming, nonlinear optimization or heuristic tree-search techniques. They all have in common that they require a large number of iterations, that is, evaluations of the cost criterion, which makes the computational burden of model-predictive control for large-scale nonlinear systems unattractive.

A technique based on trajectory sensitivities has been developed with the purpose of reducing the computational burden when the evaluation of multiple trajectories is necessary. Instead of evaluating all trajectories individually, only one trajectory is evaluated using a modified simulation method where the sensitivities with respect to key parameters are noted and approximations of the trajectories for such parameter changes can be made in a computationally efficient manner. The sensitivities of trajectories to initial conditions and/or parameters do provide an insight into the behaviour of a dynamic power system, as is described e.g. in the article by I. A. Hiskens and M. A. Pai, "Trajectory Sensitivity Analysis of Hybrid Systems", IEEE Trans. Circuits and Systems, vol. 47, pp. 204-220, 2000. However, these capabilities of trajectory sensitivities have so far mainly been used for post-mortem analysis of a collapsed power system.

DESCRIPTION OF THE INVENTION

It is therefore an objective of the invention to allow for real-time emergency control in power systems and to provide for an optimum control action adapted to prevent a particular failure or disturbance of the system. This objective is achieved by a method, system and computer program for real-time emergency control according to claims 1, 7 and 8. Further preferred embodiments are evident from the dependent patent claims.

According to the invention, upon detection of an incipient instability or other potential failure of the power system, the dependency of a trajectory of the power system on possible corrective measures or input control actions, such as a change in power load or reactive load, is analysed and an optimum control action is identified and applied to the system. Thereby, the standard prediction stage in model predictive control is replaced with the evaluation of only one nominal trajectory, along which the system would evolve without any corrective input, together with its corresponding trajectory sensitivities. The rest of the trajectories that need to be evaluated during the traditional decision stage are then approximated using the nominal trajectory and the sensitivities instead of using a full simulation for each trajectory. For large-scale nonlinear systems, this considerably reduces the computational complexity and ultimately allows to apply the method "on-line" to real power systems. Furthermore, the time dependence of the sensitivities even allows to properly reproduce a dynamic behaviour of the power system.

The detection of an incipient instability acts as a trigger for the corrective measures or processes. It preferably comprises the detection or notification of a contingency such as the discontinuous opening or closing of a switch, i.e. a change in the network topology, or a load increase or a generator rejection. The last recorded system state preceding the contingency serves as an initial point for prediction of the nominal trajectory during the subsequent calculations.

In a preferred embodiment, no corrective input or preventive action is applied to the power system as long as the nominal trajectory remains within acceptable trajectory limits, at least up to the time horizon of the prediction interval.

The identification of an optimum input control action preferably comprises the evaluation of a cost function which quantifies the difference between an output trajectory and a reference trajectory. The latter represents a target state for the trajectory, deviations therefrom are penalized. Likewise, too crude corrective measures resulting in load shedding and adversely affecting customers may be considered disadvantageous.

Preferably, the control inputs are assumed constant over the prediction interval, thus further simplifying calculations compared to the case of controls varying in time.

Nevertheless, the chosen optimum input control may be adapted should the occurrence of a further contingency during the initial prediction horizon make it necessary.

As the control inputs, depending on their type, may take on only discrete values such as tap positions, or are applicable only in discontinuous portions, Mixed Dynamic Logic (MDL) is used to handle both continuous and discontinuous controls within the same model.

BRIEF DESCRIPTION OF THE DRAWINGS

The subject matter of the invention will be explained in more detail in the following text with reference to preferred exemplary embodiments which are illustrated in the attached drawings, of which

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
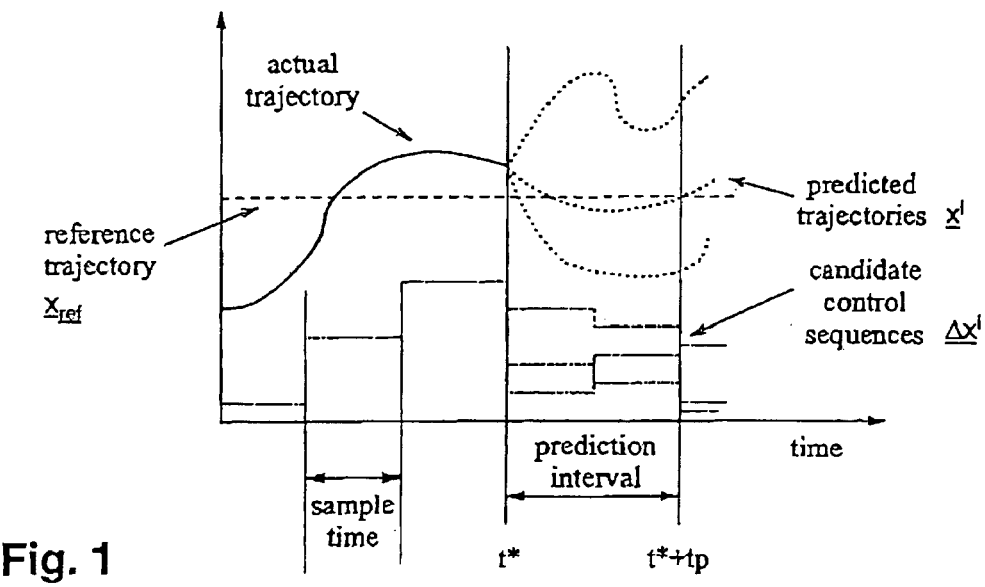
FIG. 1 illustrates state of the art model predictive control (MPC)
Figure 3:
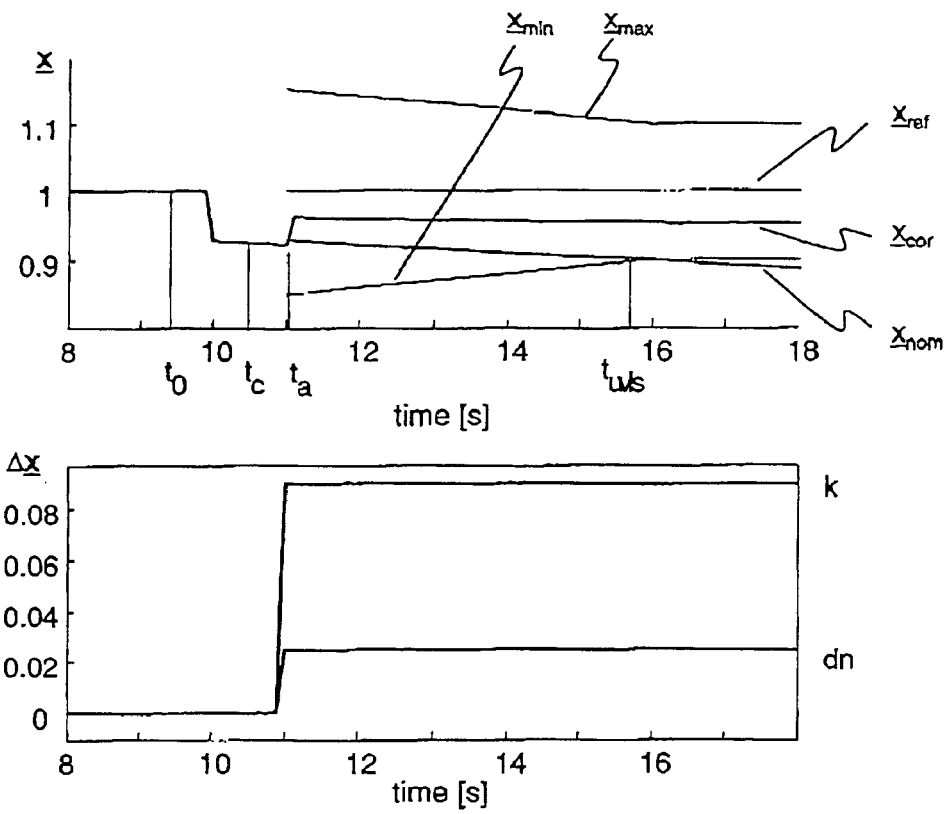
FIG. 3 depicts the effects of a real-time control on a trajectory.
Figure 2:
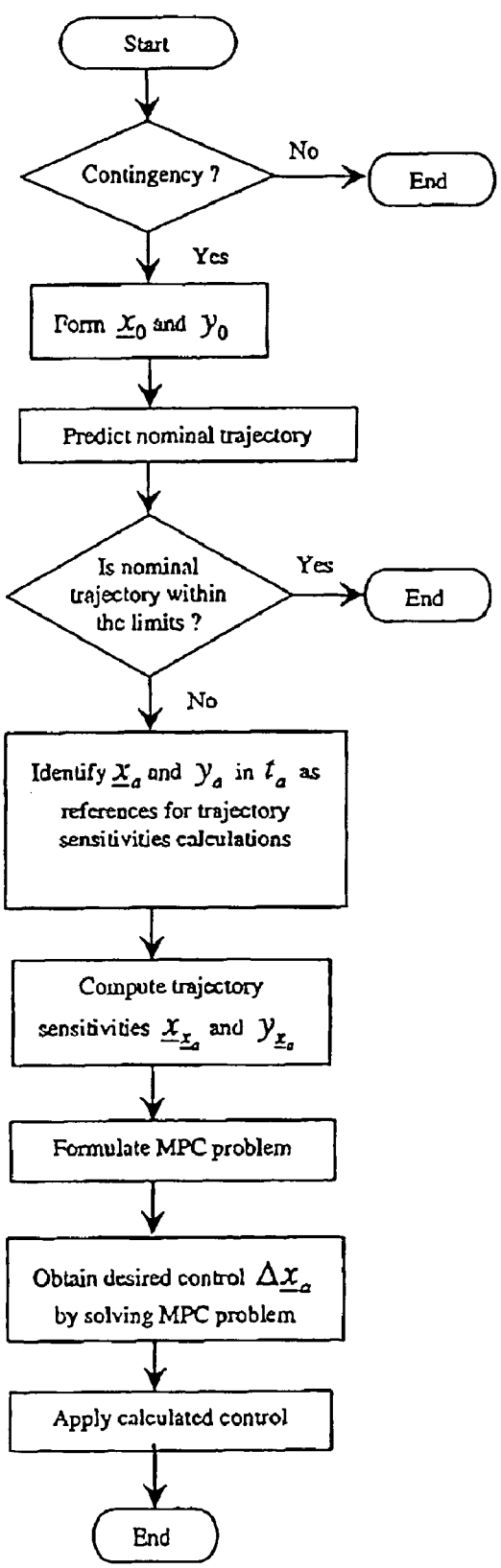
FIG. 2 is a flowchart outlining the basic principles.

FIG. 2 shows the structure of the method in the form of a flowchart. A contingency can be quickly detected and the state of the system accurately estimated using e.g. a wide-area measurement system. The data coming from the state estimator in this case are voltage and current phasors, which are processed to obtain the initial state of the system, generally denoted $x_0$. Referring to FIG. 3, upper graph, the contingency is detected at time $t_c$. To capture the dynamics of the system and especially its transition between different discrete states, the prediction takes the values one step back, at time $t_0$, as the initial state $x_0$. Based on the latter and a system model f describing the actual power system, a nominal trajectory $x_{nom}$ of the system, corresponding e.g. to a post-fault voltage, is predicted. The nominal trajectory takes into account the known contingency at $t_c$, but assumes no further disturbances or modifications to be applied to the system.

Since the calculation process together with the potential execution of a corrective action takes a certain time, the earliest time for evaluating the effect of a control will be at $t_a$ (it is assumed that the time delay $t_a - t_c$ is known). As is illustrated in FIG. 3, after $t_a$ the nominal trajectory $x_{nom}$ is checked for consistency with a predefined tolerance band ($x_{max} - x_{min}$), and as long as $x_{nom}$ is predicted to lie within the acceptable tolerance band, no corrective action is applied. The tolerance band can be wider in the beginning to allow for larger excursions of the post-fault voltage mentioned. However, the voltage typically has to recover to the normal operation range before a local under-voltage relay protection would act at time $t_{uvls}$. The sampling time, i.e. the time $t_c - t_0$ between to successive checks for contingency, may be 1 s, whereas the time delay $t_a - t_c$ may be less, e.g. 300 ms.

If the predicted nominal trajectory is not within this specified tolerance range within the specified time horizon, trajectory sensitivities calculations start. Because the corrective or input action is executed at or before time $t_a$, the trajectory sensitivities are computed with respect to the values $x_a$ expected at that time $t_a$ (available from nominal trajectory calculation) as well as for later integration time steps. In contrast to the traditional MPC, where a sequence of control inputs is determined, constant control inputs, which remain the same for the whole prediction horizon, are evaluated here. The lower graph of FIG. 3 represents two constant control inputs first applied at $t_a$, i.e. a change of a tap position dn and a load shedding factor k. The correction resulted in the trajectory denoted $x_{cor}$.

The modified version of MPC employing linear programming is then derived as outlined in a strongly simplified way below. A full account on the mathematical details can be found in the article "Stability Assessment and Emergency Control Method Using Trajectory Sensitivities", M. Zima and G. Andersson, proceedings of the 2003 IEEE Bologna Power Tech Conference, Bologna, Italy, Jun. 23-26 2003, the disclosure of which is incorporated herein for all purposes by way of reference.

Power systems dynamics can be modeled, taking into account their hybrid nature (combination of continuous and discrete dynamics), as follows:

$$\dot{x} = \underline{f}(x, y)$$

with the vectors $$x = \begin{bmatrix} x \\ z \\ \lambda \end{bmatrix} \quad \underline{f} = \begin{bmatrix} f \\ 0 \\ 0 \end{bmatrix}$$

where x are the dynamic or continuous states (generators angles, generator rotor velocities, magnetic fluxes), z represents discrete states (e.g. tap positions of transformers), λ represents parameters (for example line impedances) and y represents algebraic states (such as voltages). The flow of the system can be written:

$$\phi(\underline{x}_0, t) = \begin{bmatrix} \phi_x(\underline{x}_0, t) \\ \phi_y(\underline{x}_0, t) \end{bmatrix} = \begin{bmatrix} x(t) \\ y(t) \end{bmatrix}$$

Sensitivities of the system flow to the initial conditions and parameters are obtained by a Taylor expansion of above equation:

$$\Delta \underline{x}(t) = \frac{\partial \underline{x}(t)}{\partial \underline{x}_0} \Delta \underline{x}_0 + \text{higher order terms} \approx \underline{x}_{\underline{x}_0}(t)\Delta \underline{x}_0$$

Differentiations with respect to the initial conditions and parameters yields:

$$\underline{\dot{x}}_{\underline{x}_0} = \underline{f}_{\underline{x}}(t)\underline{x}_{\underline{x}_0} + \underline{f}_{\underline{y}}(t)\underline{y}_{\underline{x}_0}$$

The initial trajectory sensitivities values are then:

$$\underline{x}_{\underline{x}_0}(t_0) = I$$

Applying a trapezoidal integration method, a numerical expression for the computation of the time dependent trajectory sensitivities $$x_{\underline{x}_0}^{k+1} \text{ and } y_{\underline{x}_0}^{k+1}$$

at any time instant k+1 can be derived.

Since the impact of a parameter and an initial state change is expressed with help of trajectory sensitivities, a new trajectory is:

$$\begin{bmatrix} x \\ y \end{bmatrix} = \begin{bmatrix} x_{nom} \\ y_{nom} \end{bmatrix} + \begin{bmatrix} x_{\underline{x}_0} \\ y_{\underline{x}_0} \end{bmatrix} \Delta x_\alpha$$

Since $\Delta x_\alpha$ represents the control inputs, the objective function of MPC is:

$$\min \left\{ \left\| Q\left( \begin{bmatrix} x_{ref} \\ y_{ref} \end{bmatrix} - \left( \begin{bmatrix} x_{nom} \\ y_{nom} \end{bmatrix} + \begin{bmatrix} x_{\underline{x}_0} \\ y_{\underline{x}_0} \end{bmatrix} \Delta x_\alpha \right) \right) \right\|_1 + \| R\Delta x_\alpha \|_1 \right\}$$

where the sensitivity vector contains only the relevant entries (corresponding to the manipulated control inputs) for the whole prediction horizon (i.e. for all sample times starting at $t_\alpha$). The constraints on the system states (here voltages) are:

$$\begin{bmatrix} x_{\underline{x}_0} \\ y_{\underline{x}_0} \end{bmatrix} \Delta x_\alpha \leq \begin{bmatrix} x_{boundary} \\ y_{boundary} \end{bmatrix} - \begin{bmatrix} x_{nom} \\ y_{nom} \end{bmatrix}$$

and on the control variables:

$$\Delta x_{\alpha min} \leq \Delta x_\alpha \leq x_{\alpha max}.$$

In the above equations a possibility for control inputs to vary continuously within the specified constraints was assumed. However, this is not always the case in reality. Many available control inputs in power systems are of discrete nature, e.g. tap changers can move only in steps, load is connected through feeders in certain discrete amounts etc. Therefore the inclusion of this feature (discrete controls) in the model/control algorithm is needed. Mixed Logic Dynamic (MLD) concept has been proposed for control of hybrid systems. Although MLD is primarily intended to cover the hybrid behavior of the system itself, the ideas can be applied here as well. The following formula is used for control variables:

$$\Delta x_\alpha = C \cdot \delta$$

where C is the diagonal matrix containing values of available controls. Each diagonal element is actually a row vector corresponding to the discrete values of one particular control, e.g. all possible tap positions of one tap changing transformer. δ is a column vector of auxiliary binary variables (they can be either 1 or 0) consisting of sub-vectors corresponding to the C elements. Thus the sought result of the optimization procedure becomes vector δ, where all elements will be zero except the ones filled with one, pointing at the needed control input. To guarantee that only one control will be chosen per control object (e.g. only one out of the possible tap positions can be used), new constraints have to be taken into account. In addition, the inclusion of equality constraints is necessary when there is a tight connection/relation between some controls, e.g. load shedding of active and reactive power being physically coupled.

The inventive method has been applied to model system inspired by a real power transmission system which is very sensitive to outages of lines interconnecting two geographically separated areas. The possible controls considered are a) tap changer of a transformer between two nodes where the largest load is connected, b) load shedding of all available loads, and c) change of the voltage reference point setting of the generators voltage regulators. The last mentioned type of control allows utilizing of unused reactive power generation capacities (if they are available, i.e. the generators are not operated on their limits) and thus keeping the system voltage profile on the acceptable level. Since the load shedding should be used only as a last measure, if absolutely necessary, the penalties for employed controls (elements of parameter R in the cost function) have been set accordingly. The most desired control to be used is tap-changing, then setting of the generators reference points and finally load shedding. Note, that the penalties can vary within each category.

Figure 4:
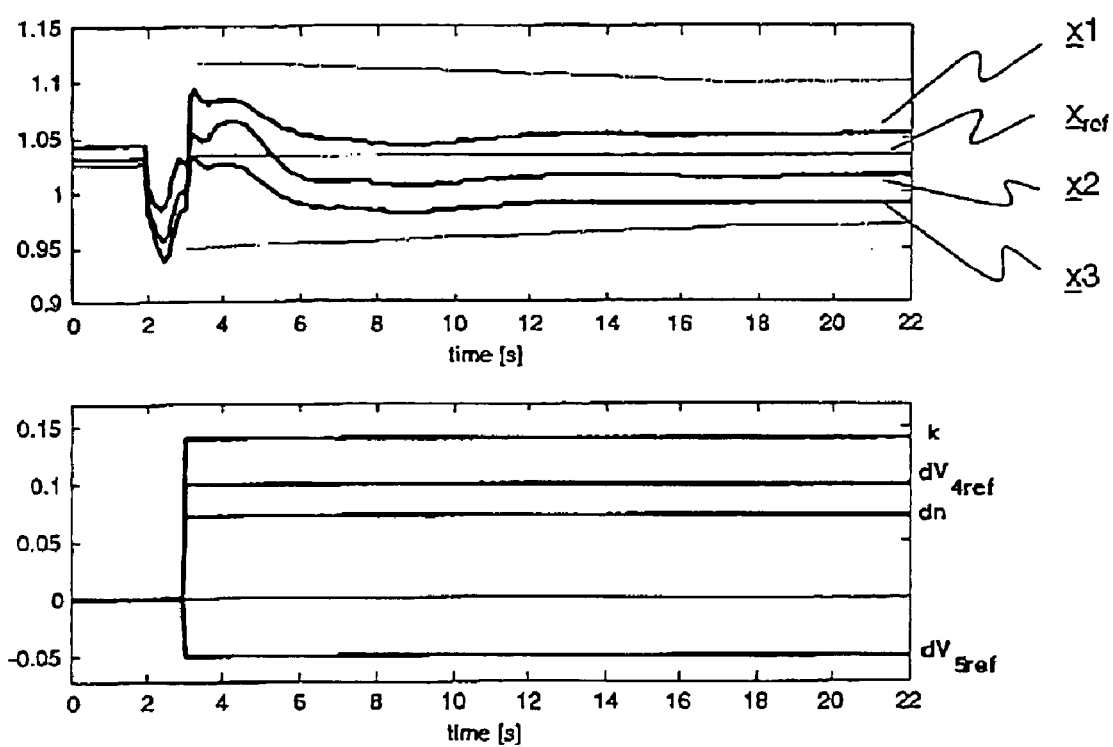
FIG. 4 shows three trajectories representing three different nodes of a real power system.

The simulated contingency is the tripping of two lines which would result in a drop of the voltage in several locations/nodes, represented by the three trajectories x1, x2 and x3, under the allowed level. However, employing the four different proposed controls as shown in the bottom graph of FIG. 4 safely stabilizes the situation (top graph). In FIG. 4 the emphasis is given on the accurate control, i.e. the weight Q is dominant over the weight R, which results in heavy engagement of the control mechanisms, especially load shedding as represented by the factor k. Yet in emergency situations in power systems the focus is more on being within the acceptable operation range, rather than to achieve certain exact (optimal) voltages, and to employ as little expensive controls (load shedding) as possible.

Although the procedure has been illustrated in the foregoing with an application to power systems voltage control, it is to be understood that the inventive method is applicable to any large-scale nonlinear system, and offers considerable computational benefits in the implementation of Model Predictive Control.

LIST OF DESIGNATIONS $\Delta x_a$ input control action
$x_{nom}$ nominal trajectory
$x_{ref}$ reference trajectory
$x_{cor}$ corrected trajectory

The invention claimed is:

1. Real-time emergency control method for power systems characterised by a system trajectory (x) and represented by a system model (f), comprising, upon detection of an incipient instability of the power system, the steps of:

approximating, by means of the system model (f) and based on a nominal trajectory ($x_{nom}$), trajectory sensitivities ($x_{x_a}$) and different input control actions ($\Delta x^i$) supplied to the system model (f), different output trajectories ($x^i$) corresponding to the different input control actions ($\Delta x^i$), and identifying an optimum input control action ($\Delta x_a$) based on a deviation of each of the different approximated output trajectories ($x^i$) from a reference trajectory ($x_{ref}$), and applying the optimum input control action ($\Delta x_a$) to the power system.

2. The method according to claim 1, wherein the detection of an incipient instability comprises the steps of detecting a contingency, and recording the overall state of the system prior to the occurrence of the contingency as an initial state for trajectory approximation.

3. The method according to claim 2, wherein the detection of an incipient instability further comprises the steps of predicting a nominal trajectory and comparing the nominal trajectory with trajectory limits.

4. The method according to claim 1, wherein the step of identifying an optimum input control action comprises the step of minimising a cost function with respect to the reference trajectory.

5. The method according to claim 1, wherein the control inputs are assumed constant over a prediction horizon.

6. The method according to claim 1, wherein the control inputs include discrete controls and in that Mixed Logic Dynamic (MLD) is employed for identifying the optimum input control action.

7. An electric power transmission system characterised by a system trajectory (x) and represented by a system model (f), for carrying out a method for real-time emergency control upon detection of an incipient instability of the power system, comprising:

means for approximating, by means of the system model (f) and based on a nominal trajectory ($x_{nom}$), trajectory sensitivities ($x_{x_a}$) and different input control actions ($\Delta x^i$) supplied to the system model (f) different output trajectories ($x^i$) corresponding to the different input control actions ($\Delta x^i$), means for identifying an optimum input control action ($\Delta x_a$) based on a deviation of each of the different approximated output trajectories ($x^i$) from a reference trajectory ($x_{ref}$), and means for applying the optimum input control action ($\Delta x_a$) to the power system.

8. A computer readable medium having computer program instructions for real-time emergency control in electric power transmission systems executable by a digital computer, to perform the method for real-time emergency control according to claim 1.

* * * * *